Dec. 22, 1970 NORIOMI OCHIAI 3,550,147

OMNIDIRECTIONAL DIELECTRIC LENS REFLECTOR

Filed April 7, 1969 6 Sheets-Sheet 1

INVENTOR.
Noriomi Ochiai

BY ATTORNEYS

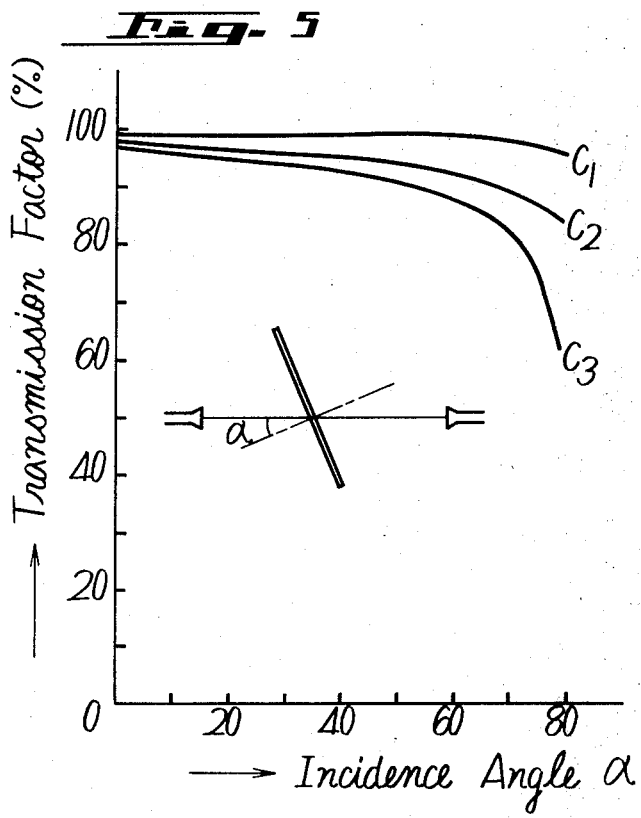
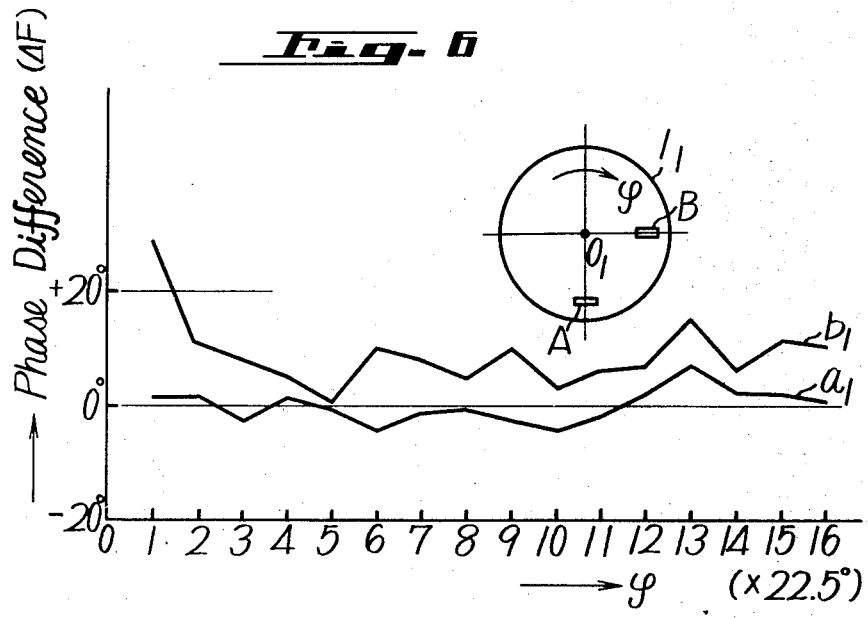

United States Patent Office 3,550,147
Patented Dec. 22, 1970

3,550,147
OMNIDIRECTIONAL DIELECTRIC LENS REFLECTOR
Noriomi Ochiai, Tokyo, Japan, assignor to Kabushikikaisha Tokyo Keiki Seizosho (Tokyo Keiki Seizosho Co., Ltd.), Tokyo, Japan, a corporation of Japan
Filed Apr. 7, 1969, Ser. No. 813,987
Claims priority, application Japan, Apr. 11, 1968, 43/24,158
Int. Cl. H01q 15/02, 15/08
U.S. Cl. 343—911                    10 Claims

ABSTRACT OF THE DISCLOSURE

An omnidirectional dielectric lens reflector consisting of a spherical core, a plurality of spherical outer layers, and film means coated on the spherical core and each spherical outer layer for passing microwaves incident thereon at relatively small incident angles within the lens along an elliptic path in accordance with the specific dielectric constant of each outer layer and for reflecting the component of the microwaves at great incident angles perpendicular to the plane of the film means without accompanying substantial phase-shift and the component parallel to the plane of the film means with a phase-shift of about 180 degrees.

BACKGROUND OF THE INVENTION

Field of the invention

This invention relates to an omnidirectional dielectric lens reflector, and more particularly to an ideal omnidirectional dielectric lens reflector of high efficiency for microwave use which could not have been produced in the past.

Description of the prior art

In conventional lenses of the aforementioned type the electric fields in the planes of polarization of the waves thereby reflected are likely to cancel one another due to the property of the lenses to render the resultant electric field nearly zero. This lowers the efficiency of the prior art lenses and prevents their practical use.

SUMMARY OF THE INVENTION

The primary object of this invention is to provide a highly efficient omnidirectional dielectric lens reflector which is free from the aforementioned drawback experienced in the prior art and is adapted such that reflected waves are arranged in the same plane of polarization and in an equiphase plane.

Other objects, features and advantages of this invention will become apparent from the following description taken in conjunction with the accompanying drawings.

BRIEF DESCRIPTION OF THE DRAWINGS

FIG. 5 is a graph showing the relationship between the incident angle and transmission factor of electric waves in response to changes of the blending ratio of a metallic powder and polyvinyl acetate emulsion for forming a semitransparent film to be coated on the outer surfaces of the spherical shells making up the omnidirectional dielectric lens reflector of this invention;

FIG. 6 is a graph showing that the vectors of reflected waves, which are opposite in phase in the conventional lens reflector, can be caused to agree in phase with one another within 10 degrees by coating the semitransparent film on the spherical shell layers of the omnidirectional dielectric lens reflector in accordance with this invention;

DESCRIPTION OF THE PREFERRED EMBODIMENTS

The detection, by means of radar, of a small target whose reflecting power is low can be facilitated by attaching a suitable radar reflector to the target. For this purpose a corner reflector or a Luneberg lens reflector has heretofore been employed, but such reflectors do not act effectively in all directions. Reflectors having an omnidirectional reflection characteristic are much desired for various uses, but there have not ever been proposed highly practical reflectors which satisfy the requirement.

For a better understanding of the present invention a description will be given first in connection with one example of lenses which have heretofore been proposed as omnidirectional dielectric lens reflectors.

Figure 1:
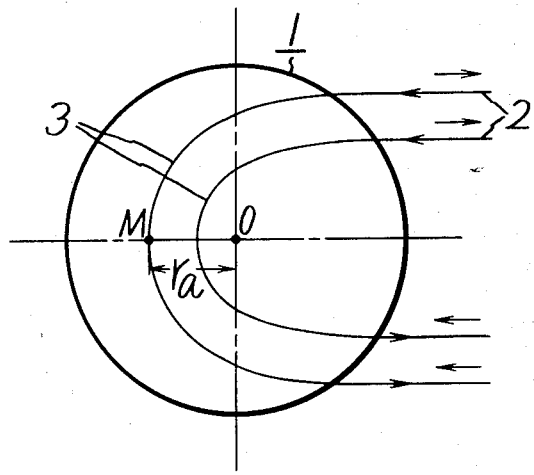
FIG. 1 is a schematic diagram for explaining the operation of a conventional omnidirectional dielectric lens reflector.

In FIG. 1 reference numeral 1 indicates a spherical dielectric lens and its specific dielectric constant K is a function of a distance $r'$ alone from the center thereof and can be expressed as follows, $$K = \frac{2-r}{r} \quad (1)$$

where $r$ is a normalized radius and is expressed as $r=r'/R$, R being the outer radius of the lens 1. From the above equation it will be seen that the specific dielectric constant K is infinite at the center of the lens and 1 at the outer periphery. It is well-known that the above equation can be derived by putting one focus of the spherical lens to be $+\infty$ and the other one to be $+\infty$ similarly in the general solution by Luneberg. If now a plane wave 2 strikes the lens 1 as shown in FIG. 1, the wave 2 traverses an elliptic path in the lens 1 and leaves it in a direction parallel to that in which the wave came. It will be apparent that since the lens 1 is symmetrical about its center O, plane waves have entered the lens 1 from any directions traverse an elliptic path within the lens and return in directions parallel with those of the incident waves.

As is seen from the foregoing equation, the specific dielectric constant K of the material forming the lens 1 is symmetrical with respect to its center O, and accordingly it will be understood from the Fermat's theorem that an electric wave having entered the lens 1 from one point on the spherical surface thereof is propagated along a circular cross section (a great circle) including the point of incidence of the wave and the center O of the lens 1.

Hitherto, studies on the lenses have been made on the basis of the above consideration and a two-dimensional solution has been used for finding out the path of an electric wave entering the lens. It is taken for granted that when the specific dielectric constant of the spherical dielectric lens satisfies the Equation 1 the lens acts as an omnidirectional lens reflector in which the electric waves having entered the lens are reflected back in the direction parallel to that of the incident waves along an elliptic path within the lens as described above. However, no attention has been paid to the fact that when the reflected waves leave the lens and return in the direction parallel to that of the incident waves the planes of polarization of the waves are different depending upon the points on the spherical surface of the lens where the waves have entered it, and consequently it has been overlooked that the electric fields of the reflected waves cancel one another to reduce the resultant electric field to substantially zero. That is, the cause of the low reflection efficiency of the conventional lens reflectors has not been noticed. In other words, it has been left unnoticed that if the conventional lenses have been produced correctly in theory, the reflected waves from these lenses are reduced to zero.

Figure 2A:
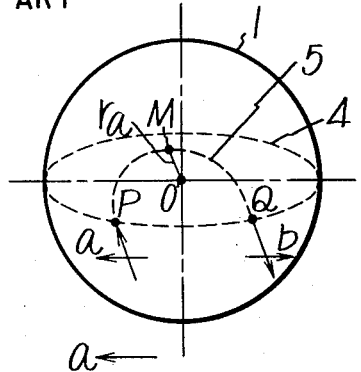
FIGS. 2A and 2B are schematic diagrams for fundamentally explaining the relationship of the planes of polarization between the electric field vectors of incident waves and those of reflected waves in the conventional omnidirectional dielectric lens reflector.
Figure 2B:
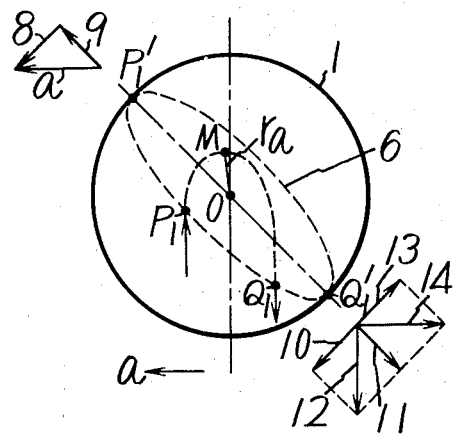

A detailed description will hereinafter be given in connection with one example of this invention. Referring now to FIGS. 2A and 2B, the relationship between the path of an electric wave within this type of a lens and the electric field vector of the wave will be described. Assuming that an electric wave of such an electric field vector as indicated by $a$ in FIG. 2A has entered the lens 1 at a point P on its spherical surface as an electric wave of horizontal polarization, the wave is propagated in the lens 1 on a circular cross section 4 (a great circle) including PO, O being the center of the spherical lens 1. This is apparent from the Fermat's theorem. Since the electric wave traverses an elliptic path 5 on the great circle 4 as mentioned above, its electric field vector at a point Q where the wave leaves the lens 1 becomes as indicated by $b$. In this case the plane of polarization of the electric wave $b$ is horizontal but its direction is opposite to that of the electric field vector $a$ of the incident wave, as is apparent from FIG. 2A. The same is true of electric waves having entered the spherical lens 1 at any points on the circumference of the circular cross section 4 including OP due to the characteristics of the spherical lens.

Let it be assumed that an electric wave of horizontal polarization having an electric field vector $a$ enters the lens 1 at a point $P_1$ and runs along a circular cross section 6 including $P_1O$ inclined at an angle of 45 degrees to the vector $a$ as depicted in FIG. 2B. A consideration will be given to the relationship between the electric field vectors in the case where the electric wave having entered the lens 1 at the point $P_1$ or $P_1'$ on the circumference of the circular cross section 6 leaves the lens 1 at a point $Q_1$ or $Q_1'$. The incident wave at the point $P_1$ or $P_1'$, that is, an electric wave $a$ of horizontal polarization is resolved into components 9 and 8 which are respectively parallel with and vertical to the circular cross section 6. When the electric wave incident on the lens 1 at the point $P_1$ leaves it at the point $Q_1$, the component 9 parallel with the circular cross section 6 becomes opposite in direction as indicated by 11, while the vertical component 8 remains in the same direction 10 as at the incidence on the lens 1, with the result that the resultant electric field vector becomes as indicated by 12. That is, the electric wave $a$ of horizontal polarization having entered the lens 1 is converted into a wave 12 of vertical polarization when leaving the lens 1. It will be seen from the foregoing that the same is true of electric waves incident on the lens at any points of the circumference of the circular cross section 6.

Figure 3:
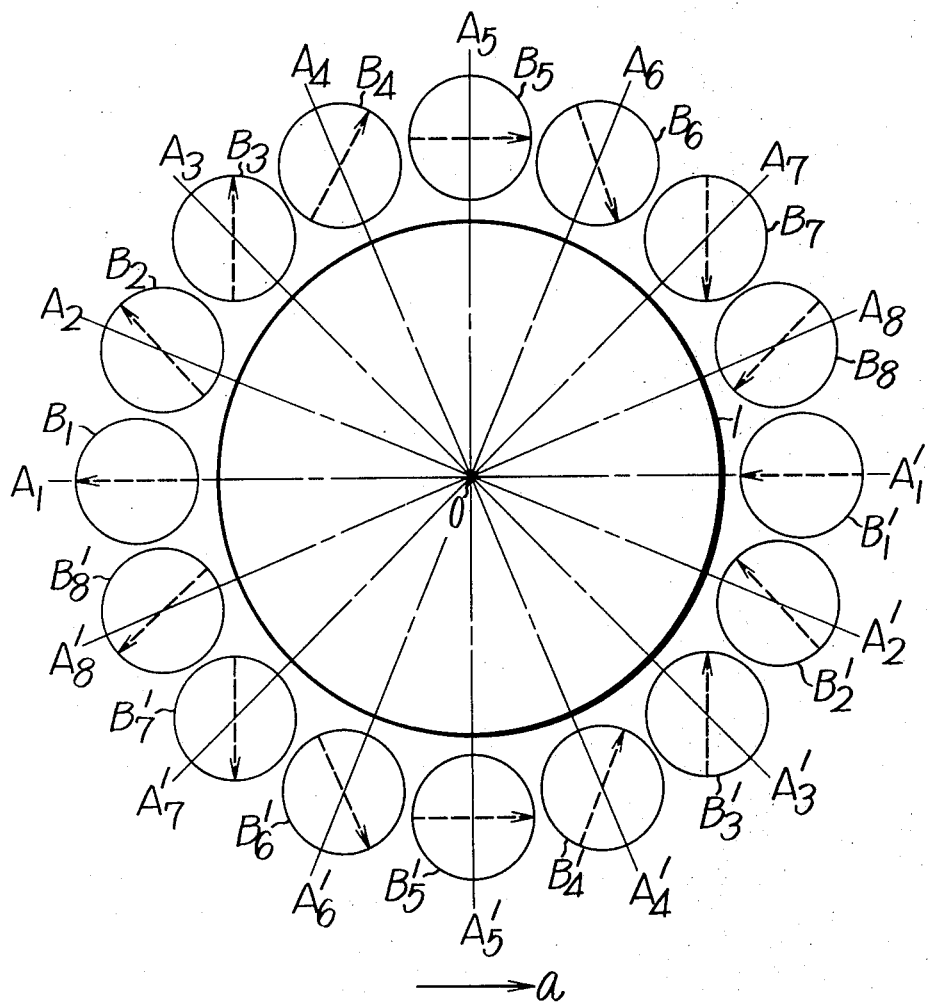
FIG. 3 is a schematic diagram showing the variations in the planes of polarization of the electric field vectors of reflected waves leaving the prior art omnidirectional dielectric lens reflector when electric waves of horizontal polarization have entered the lens reflector.

The foregoing has discussed as the path of the electric wave of horizontal polarization, the planes including the center O of the lens which are respectively parallel with and inclined at an angle of 45 degrees to the electric field vector of the electric wave. Referring now to FIG. 3, a discussion will be given of the path of an electric wave incident on the lens at a given point. FIG. 3 shows the relationship between the electric field vectors of the incident waves and those of the reflected waves in the cases where the circular cross section including the center O of the lens is inclined at various angles to the electric field vector $a$ of the incident waves which are electric waves of horizontal polarization.

In FIG. 3 reference character $a$ similarly indicates the electric field vector of an incident wave and straight lines $A_1A_1'$, $A_2A_2'$, . . . $A_8A_8'$ all pass the center O of the lens 1 and are spaced apart at an equiangular distance. Broken line arrows in circles $B_1$, $B_1'$, $B_2$, $B_2'$, . . . $B_8$, $B_8'$ on the straight lines $A_1$, $A_1'$, . . . $A_8$, $A_8'$ on the outside of the lens 1 respectively represent the electric field vectors of the reflected waves when an electric wave of the horizontal electric field vector $a$ has entered the lens 1.

A detailed description will be made of the incident wave passing the plane of the lens 1 including the straight line, for example, $A_1A_1'$. When an electric wave indicated by the vector $a$ enters the lens 1 in the plane including the straight line $A_1A_1'$ on the side $A_1$ with respect to the center O of the lens 1, it becomes a reflected wave of such a vector as shown in the circle $B_1'$, while an electric wave $a$ incident on the lens 1 in the plane including the straight line $A_1A_1'$ but on the side of $A_1'$ becomes a reflected wave of such a vector as depicted in the circle $B_1$. Further, where the electric wave of the vector $a$ is incident on the lens 1 in the plane including the straight line $A_7A_7'$ on the side of $A_7$ relative to the center O of the lens 1, it appears in the form of a reflected wave having a vector such as shown in the circle $B_7'$, while the electric wave of the vector $a$ incident on the lens 1 on the side of $A_7'$ appears in the form of a reflected wave having a vector shown in the circle $B_7$. The vectors shown in broken lines in the other circles $B_2$, $B_2'$ . . . $B_6$, $B_6'$, $B_8$ and $B_8'$ respectively bear the same relationship with the vector $a$.

Figure 7:
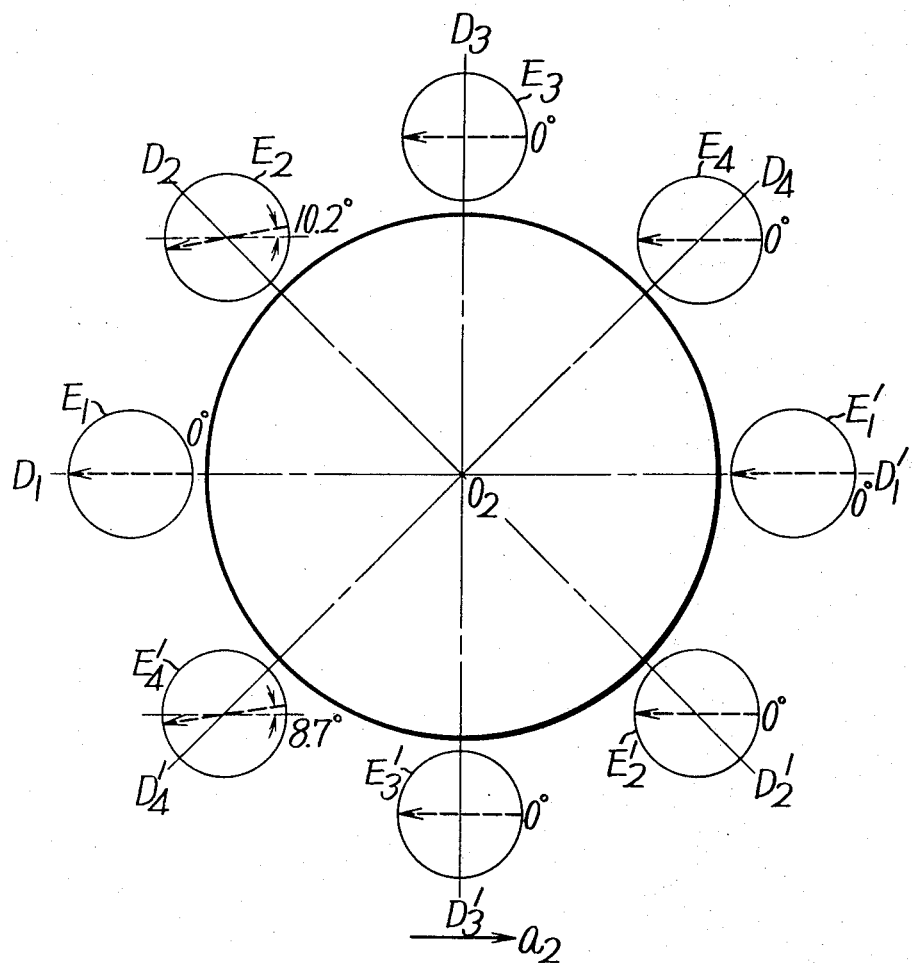
FIG. 7 is a schematic diagram showing that when electric waves of horizontal polarization enter the omnidirectional dielectric lens reflector of this invention, the planes of polarization of the electric field vectors of reflected waves coming out from the lens reflector are almost all in agreement with one another.

As is apparent from the foregoing, even if the electric field vector $a$ of the incident wave is horizontal as depicted in the figure, the electric field vectors of the reflected waves from the lens 1 at various points thereof are different dependent upon the inclination angles of the circular cross sections to the vector $a$ as indicated in the circles $B_1$ to $B_8'$. Namely, the reflected wave is in such a form as if its electric field vector turns twice along the circumference of the lens 1. Accordingly, it will readily be understood that the electric field vectors of the reflected waves are cancelled one another thereby to reduce the total sum of the electric field vectors of the reflected waves in their reflected directions (parallel with the incident directions) to zero. If the incident wave travels along the elliptic path 3 (FIG. 1) and the distance from the center O of the lens 1 to the elliptic path 3 is taken as $r_a$, when the incident wave passes a point where the distance $r_a$ is at minimum ($r_{min}$), that is, the point M in the examples of FIGS. 1 and 2, the component 9 of the electric field vector $a$ of the incident wave, which is parallel with the plane including the elliptic path, agrees with the direction of a normal to the ellipse at the point M and hence the component 9 passes the point M without any change in phase. While, the component 8 of the electric field having a right angle with the plane of the elliptic path is in such a direction as is tangential to the circumference of a circle having a straight line OM as its radius at the point M. Accordingly, if only the component 8 is changed in phase by 180 degrees, the electric field vectors of the reflected wave can be rendered in the same plane of polarization. That is, assuming that the component 9 of the electric field vector of the incident wave is not subjected to any phase variation at the point M, it becomes an electric field vector of a component indicated by 11 when it leaves the lens 1 at the point $Q_1$ as above described. While, if only the component 8 having a right angle with the plane of the elliptic path is subjected to a phase variation of 180 degrees by some means when passing the point M, the component 8 leaving the lens at the point $Q_1$ is converted into an electric field vector component 13 which is antiphase to the aforementioned component 10. Consequently, the resulting reflected wave is a composition of the components 11 and 13, that is, an electric field vector 14 of an electric wave of horizontal polarization such as shown in FIG. 2B. Namely, the electric field vector 14 thus obtained lies in the same plane of polarization as the electric field vector $a$ of the incident wave, as is apparent from FIG. 2B. If such operation as above described is possible with incident waves in practice, the electric field vectors of the reflected waves coming out from various points of the lens can be caused to lie in the same plane of polarization as illustrated in FIG. 7 described later. In addition, since the resulting electric field vectors are equi-phase in terms of time, the electric field vectors of the reflected waves in their reflected direction are added together and a reflected wave of large energy as a whole can be obtained. Accordingly, a highly efficient omnidirectional lens reflector can be obtained. The phase change to the incident waves as set forth above is similar to a phenomenon which is caused by reflection of electric waves on a metal plate. In order that electric waves may be reflected by a spherical dielectric lens back in the direction parallel with that in which they came, the specific dielectric constants K of respective parts of a dielectric material making up the spherical dielectric lens reflector should be selected in accordance with the aforementioned Equation 1

$$K = \frac{2-r}{r}$$

as previously described. However, with mere use of such spherical dielectrical lens, the total sum of the electric field vectors of the reflected waves becomes zero as above described.

A dielectric material of low propagation loss and infinite specific dielectric constant corresponding to the above Equation 1 is not available at present. Instead of using such an unobtainable dielectric material, a spherical dielectric lens is produced by hollowing out the center thereof less than 2.5% in radius or filling up the space with a dielectric material of the same specific dielectric constant. Even if the central portion of the dielectric lens does not perform the function of a lens, it causes a loss of only 10 percent or so. With the central space of the lens being filled up with the same material or hollowed out, the specific dielectric constant K of the dielectric material forming the outer portion of the spherical dielectric lens may well be substantially 1 to 100 in accordance with the aforementioned Equation 1. It is difficult in practice to make a dielectric lens reflector the specific dielectric constant K of which varies continuously from 1 to 100 in accordance with the Equation 1. Accordingly, a method is adopted such that the specific dielectric constant is varied in a stepwise manner by dividing the outer portion of a lens reflector into 10 to 50 concentric spherical shell layers in accordance with the dimension of its diameter. To cite an example of such conventional method, a spherical dielectric lens reflector is produced by sequentially assembling, about a spherical core made of a dielectric material of a specific dielectric constant 100, many spherical shell layers of dielectric materials of predetermined specific dielectric constants which are substantially concentric with the spherical core. Of course, the above predetermined specific dielectric constants are determined in accordance with the Equation 1:

$$K = \frac{2-r}{r}$$

If it is rendered possible, by the provision of a suitable means, for example, a film coating on the outer or inner surface of each of the spherical shell layers of the dielectric lens, that each of electric waves having entered the lens is given a characteristic such as in the case of reflection with a metal plate on the elliptic path of the wave at a point corresponding to the point M (refer to FIGS. 1, 2 and 4), that is, the electric wave component vertical to the plane including the elliptic path is subjected to a phase change of 180 degrees, the reflected waves from the lens are added together as previously described. However, mere provision of a metallic film on the outer surface of each spherical shell prevents the electric waves from entering the lens. Namely, the lens does not ever function as a lens.

This invention is to provide a lens reflector in which each of the aforementioned spherical shell layers is provided, for example, at its outer surface with means which performs the same function as a metal in respect of the aforementioned reflection of the electric waves at the point M but permits the passage of the electric waves therethrough with substantially no absorption and reflection of the waves at other positions.

Figure 4:
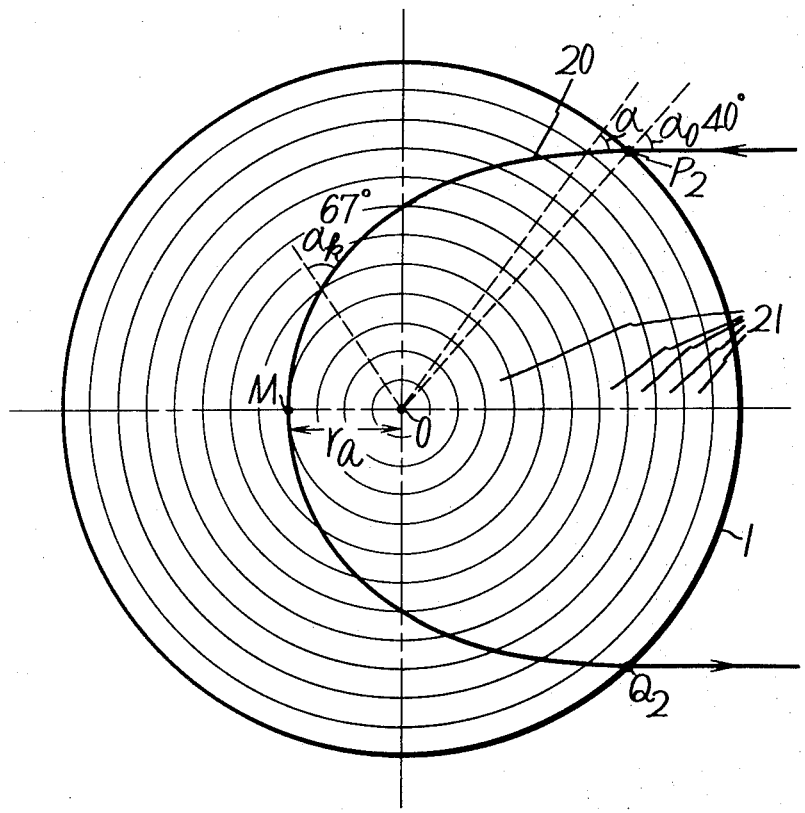
FIG. 4 is a schematic diagram illustrating the manner in which an electric wave having entered the conventional omnidirectional dielectric lens reflector is reflected back in a direction parallel to that of the incident wave, the wave travelling in the lens along an elliptic path in accordance with the specific dielectric constants of individual spherical outer layers making up the lens reflector and the incident angle of the wave on each spherical outer layer gradually increasing for the first half of the elliptic path and gradually decreasing for the latter half of the path.

FIG. 4 is a cross-sectional view of a lens 1 including its center O, illustrating the relationship between the path of an electric wave and the cross section of each spherical shell layer. Reference numeral 21 indicates spherical shell layers of the lenses 1 and 20 an elliptic path of the electric wave which is incident on the lens 1 at a point $P_2$ and is reflected back by the lens to leave it at a point $Q_2$. Although the incident angle of the electric wave traversing the elliptic path 20 is 40 degrees on the outermost shell layer of the lens 1, for example, at the point $P_2$, the path inside the lens 1 is gradually curved due to differences in the specific dielectric constants of the respective spherical shell layers, as indicated by the elliptic path 20. Since the specific dielectric constants of the spherical shell layers are determined in accordance with the aforementioned Equation 1, the incident angle of the electric wave on each layer of the lens 1 gradually increases as it approaches the inside of the lens as shown in the figure and the incident angle on the spherical shell layer immediately before the point M ($r_{min}$) is as great as about 67 degrees. From an examination of the paths of electric waves incident on the outermost spherical shell layer at other points, it has been found that the indent angles of the waves on the spherical shell layer immediately before the point M ($r_{min}$) are approximately 70 degrees in most cases. It appears from this that the aforementioned film coating laid on the outer surface of each spherical shell layer may be such that permits the passage of at least more than 90% of the waves of an incident angle of less than 70 degrees therethrough and is capable of providing the waves of an incident angle exceeding 70 degrees with reflection characteristic which is similar to that yielded when the waves strike a metal plate.

Next, a description will be made in connection with one example of the film coating of this invention which has a characteristic such as mentioned above.

FIG. 5 shows measured values of the electric wave transmission factor of a spherical shell layer of a lens reflector produced according to this invention in which the spherical shell layer is coated, for example, over its outer surface with film coating formed of mixture of vinyl acetate emulsion consisting of a 65% solution of polyvinyl acetate with aluminum powder in various ratios (by weight), the ordinate representing the transmission factor in percentage and the abscissa the incident angles $\alpha$ of the electric waves on the film coating in degree. With an increase in the amount of the aluminum powder relative to the vinyl acetate emulsion, the reflection characteristic becomes very similar to that in the case of reflection on a metal surface but the transmission factor of the electric wave lowers. In order to attain the object of this invention, the film coating is desired to have great transmission factor for electric waves of an incident angle of less than 70 degrees but have the metal surface reflection characteristic for electric waves of an incident angle exceeding 70 degrees. It has been found suitable for this purpose to mix the aluminum powder with the vinyl acetate emulsion in the ratio of 15 to 20% relative to the total amount of the mixture.

In FIG. 5 curves $C_1$, $C_2$ and $C_3$ respectively show the relationships between the incident angle and the transmission factor in the cases where the aluminum powder is added to the vinyl acetate emulsion in the ratios of 15%, 20% and 30% by weight with respect to the latter. With the provision of the film coating on the outer surface of each spherical shell layer of the spherical dielectric lens by coating the above pasty mixture, an electric wave having entered the lens is refracted at the boundary between adjacent spherical shell layers in accordance with their specific dielectric constants and passes through the film coating formed on the outer surface of each spherical shell layer with practically no loss due to the film coating and runs along an elliptic path in the lens. When the electric wave has reached the point M ($r_{min}$) it is reflected as in the case of reflection on a metal surface, that is, the electric field vector component which is normal to the spherical surface of the spherical shell at the point M is reflected without any phase change and the electric field vector component which is parallel to the tangential plane of a circle of a radius OM at the point M is subjected to a phase change of approximately 180 degrees. As a result of this, the reflected waves emanating from the lens at respective points thereon are all in the same plane of polarization and equiphase, so that the overall electric field vector in the reflected direction is the total sum of the absolute values of the individual electric field vectors of the reflected waves, thus attaining the aforementioned purpose.

FIG. 6 is a graph showing the results of measurement of the relationship between the phase difference $\Delta F$ of electric waves of horizontal polarization incident on the above-described omnidirectional dielectric lens reflector $1_1$ of this invention and received by two pickup horns on the spherical surface of the lens at points A and B and the rotational angle $\phi$ of the lens $1_1$ rotated about an axis passing through its center in parallel with the incident direction of the electric waves. In this graph the ordinate represents the phase difference $\Delta F$ relative to a certain reference phase in degree and the abscissa the rotational angle $\phi$ of the lens in degree. Curves $a_1$ and $b_1$ respectively correspond to the pickup horns placed at the points A and B, and accordingly the difference between the curves $a_1$ and $b_1$ is representative of the phase difference between the electric waves received at the points A and B. In the conventional lens reflector the vectors indicated in the circles $B_5'$ and $B_1'$ in FIG. 3 correspond to the horns at the points A and B, and a comparison of the vectors shows that they are displaced 180 degrees apart in phase. With the present invention, however, the phase difference can be reduced to less than 10 degrees, as clearly shown in FIG. 6. It appears from this that the film coating on the outer surface of each spherical shell layer of this invention gives the electric waves a characteristic which is extremely similar to the metal surface reflection characteristic. Namely, the reflected waves hardly cancel each other as in the prior art and hence reflected waves of high energy can be obtained. In the measurement shown in FIG. 6 the pickup horns were fixed at the points A and B and the lens was turned about the axis passing through its center in parallel with the incident direction of the electric waves so as to examine the dispersion of the phase difference of the reflected waves emanating from respective points of the lens.

FIG. 7 shows the results of measurement by a pickup horn of the planes of polarization of reflected waves emanating from various points of a lens similar to that used in the measurement of FIG. 6 when electric waves of horizontal polarization have entered the lens $1_2$.

In the figure reference numeral $1_2$ indicates an omnidirectional dielectric lens reflector of this invention such as illustrated in FIG. 4 and straight lines $D_1D_1'$, $D_2D_2'$, $D_3D_3'$ and $D_4D_4'$ pass through the center $O_2$ of the lens $1_2$ and are spaced at equiangular distance. Broken line arrows (vectors) in circles $E_1$, $E_1'$, ... $E_4$ and $E_4'$ on the straight lines on the outside of the lens $1_2$ respectively show vectors of reflected waves when incident waves indicated by an arrow (vector) $a_2$ have entered the lens $1_2$. Since the relationship of the incident vector-$a_2$ and the reflected wave vectors from the lens $1_2$ are the same as that above described with FIG. 3, no description will be repeated.

From FIG. 7 it is readily presumed that the reflected waves from the lens $1_2$ of the present invention lie in substantially the same plane of polarization. In this case the specific dielectric constants of the spherical shell layers of the lens $1_2$ are selected to satisfy the aforementioned equation $$K = \frac{2-r}{r}$$

and accordingly the reflected waves from the lens $1_2$ are rendered equi-phase.

Figure 8:
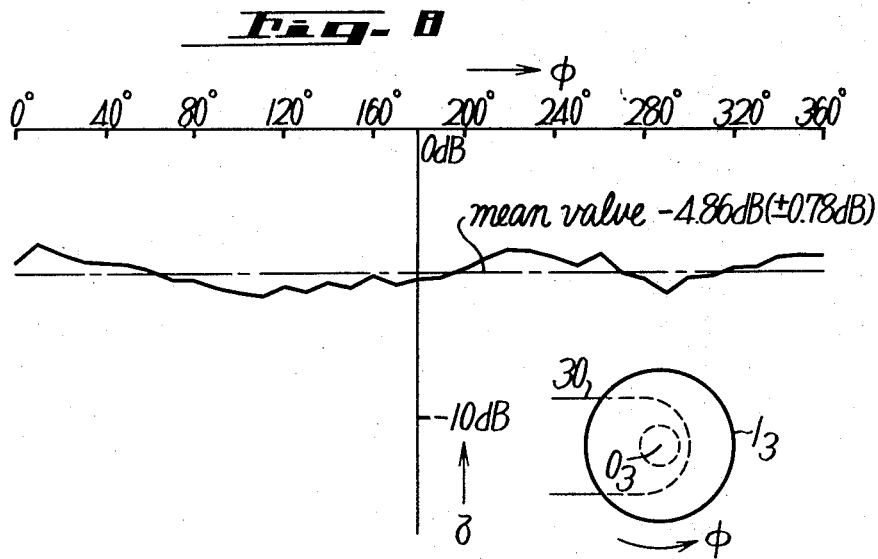
FIG. 8 is a graph showing measurements of the performance of the omnidirectional dielectric lens reflector of this invention.

FIG. 8 shows the results of measurement of the performance of an omnidirectional dielectric lens reflector $1_3$ having a radius of 64 mm., produced according to the present invention. In the figure the abscissa represents in degree the rotational angle $\phi$ of the lens $1_3$ rotated about an axis passing its center $O_3$ and perpendicular to a plane including an electric wave path 30, and the ordinate the radar cross section of the lens $1_3$ in $d$B. In this case zero $d$B implies the radar cross section of the lens of no loss. In this experiment the lens comprises a sphere of 17 mm. in radius surrounded by a metallic foil to render the sphere not to perform the lensing action and outer spherical shell layers each coated with the film coating of this invention. The specific dielectric constants K of the spherical shell layers of the lens $1_3$ obtained with the Equation 1 are given in the following table.

| Layer Number | Specific dielectric constant | Radius, mm. |
|---|---|---|
| Spherical metal core | | 17 |
| 1 | 5.77 | 21 |
| 2 | 4.60 | 25 |
| 3 | 3.65 | 30 |
| 4 | 2.96 | 35 |
| 5 | 2.40 | 40 |
| 6 | 2.02 | 45 |
| 7 | 1.69 | 50 |
| 8 | 1.42 | 56 |
| 9 | 1.14 | 64 |

Figure 9:
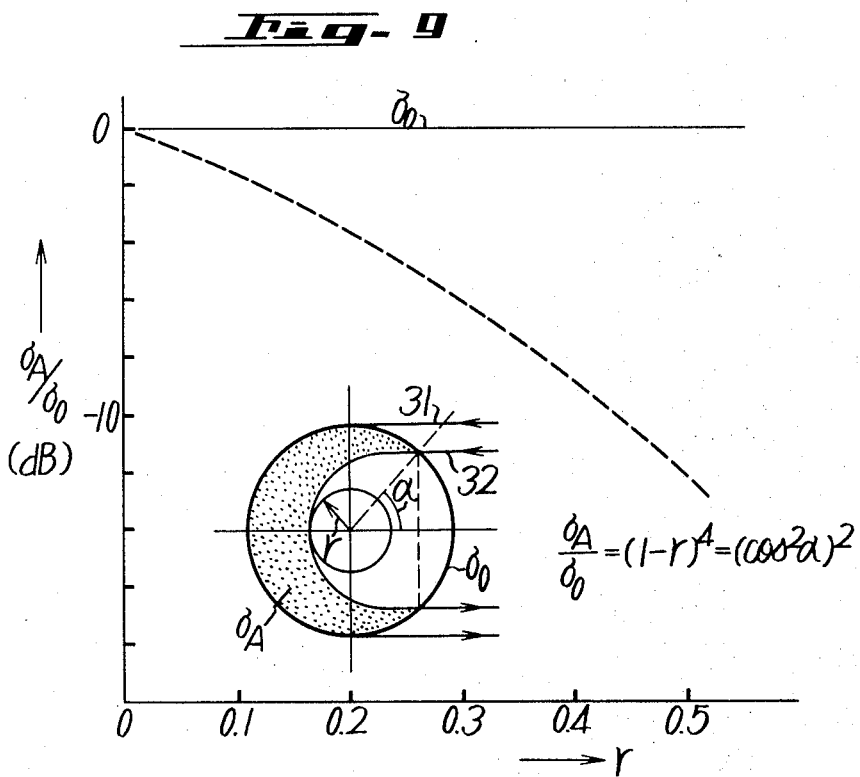
FIG. 9 is a graph showing the results of calculations made on loss caused by a small metallic spherical core placed in the center of the lens reflector of FIG. 8, in terms of a function of the radius of the spherical core.

FIG. 9 is a graph schematically showing a loss caused by that spherical metal core of the lens $1_3$ which does not act as a lens. Since the electric wave having entered the lens traverses it along an elliptic path, the lens exerts a lensing action on those of incident waves which strike the lens on the spherical surface thereof between an elliptic path 32 tangent to the metal core and that 31 tangent to the spherical surface of the outermost shell layer. Let it be assumed that the overall structure of the sphere acts as a lens, and the radar cross section of such an ideal lens of no loss is taken as $\sigma_0$. In the case of the lens having enclosed therein the spherical metal core at its center, the spherical core does not act as a lens. Accordingly, if the radar cross section of the lens of this case is taken as $\sigma_A$, $\sigma_A/\sigma_0$ represents the ratio of the radar cross sections of the both lenses, that is, the efficiency of the lens having the spherical metal core. In FIG. 9 the ordinate represents the efficiency $\sigma_A/\sigma_0$ of the lens in $d$B and the abscissa the normalized radius $r$ of the central portion of the lens, that is, the portion which does not function as a lens. The electric wave path in the lens is elliptic within a range that the lens performs the function of a lens, and consequently $$\sigma_A/\sigma_0 = (1-r)^4$$

is resulted. In the example of FIG. 8 the radius of the spherical metal core is 17 mm. and that of the outermost shell layer is 64 mm., so that the normalized radius $r$ is given as follows:

$$r = \frac{17}{64} = 0.265$$

and it appears from the curve of FIG. 9 that the loss caused by the spherical metal core is 5.4 $d$B. The losses of such a lens measured over the entire angular range of 360 degrees are shown in FIG. 8 and the mean value of the losses is 4.86 $d$B and deviation according to direction is as low as $\pm 0.78$ $d$B. Theoretically, the spherical metal core causes a loss of 5.4 $d$B but the measured values of the total loss are a little lower than it and such a slight difference may be regarded as an error in the measurements. From the measured values it will be seen that substantially no propagation loss of the electric wave occurs in the lens. Accordingly, the lens of this invention renders the reflected waves to be in the same plane of polarization and equiphase with the provision of the specific film coating, and this proves excellent performance of the lens. It is a matter of course that the loss of the lens can be reduced further, as will be seen from FIG. 9, by decreasing the radius of the spherical metal core of the lens to increase the portion which effects a lens action. Although the present invention has been described in connection with reflection of electric waves of horizontal polarization, it will be readily understood that in the case of electric waves of other linear polarizations the lens of this invention operates in a manner similar to that in the case of the electric waves of horizontal polarization, thereby to reflect the waves in the direction parallel to that of the incident waves.

Although the foregoing description has been given in connection with the case where the pasty mixture of the aluminum powder with the vinyl acetate emulsion is coated on the outer surface of each spherical shell layer of the lens of this invention, the material of this coating is not limited specifically to the exemplified one and may be the following ones. Namely, the coating material may be a mixture of a metallic powder other than aluminum powder with an adhesive binder material such as vinyl acetate emulsion, an epoxy resin, polyurethane system synthetic resin or like system synthetic resin. Instead of coating such mixtures, a metallic film may be formed on the outer surface of each spherical shell layer. Further, instead of coating such mixture and metallic film, transparent electrically conductive film such, for example, Nesa coating (trademark) can be used, in which the Nesa coating is formed to pass therethrough electromagnetic waves incident thereon at rather low incident angles and to give reflecting characteristics similar to those of metallic film to electromagnetic waves incident thereon at high incident angles. According to a particular wavelength of the working electric waves, a metallic net may be mounted on the outer surface of each spherical shell layer, in which case, too, the same results can be yielded.

It will be apparent that many modifications and variations may be effected without departing from the scope of the novel concepts of this invention.

I claim as my invention:

1. An omnidirectional dielectric lens reflector for electromagnetic waves comprising a spherical core made of a dielectric material, a plurality of spherical outer layers each made of a dielectric material and surrounding said spherical core substantially concentrically therewith, said spherical core and each of said spherical outer layers having a specific dielectric constant determined approximately by the equations $$K = \frac{2-r}{r}$$

$K$ being the specific dielectric constant of said spherical core and each spherical outer layer, $r$ being a normalized radius of each spherical outer layer relative to the maximum radius of the whole lens reflector, and means provided on each spherical outer layer, said means permitting the passage of the electromagnetic waves therethrough upon impingement of said electromagnetic waves on the plane of said means at relatively small incident angles and reflecting the components of the electric field of the electromagnetic waves perpendicular to the plane of said means with substantially no phase-shift and reflecting the components of the electric field of the electromagnetic waves parallel with the plane of said means with a phase-shift of approximately 180 degrees upon impingement of said electromagnetic waves on the plane of said means at relatively large incident angles, thereby to arrange the waves reflected from the lens in substantially an equiphase plane and the same plane of polarization.

2. An omnidirectional dielectric lens reflector as claimed in claim 1 wherein said means is formed on the outer surface of each spherical outer layer.

3. An omnidirectional dielectric lens reflector as claimed in claim 1 wherein said means is formed on the inner surface of each spherical outer layer.

4. An omnidirectional dielectric lens reflector as claimed in claim 1 wherein said means is formed on the outer surface of the spherical core.

5. An omnidirectional dielectric lens reflector as claimed in claim 1 wherein said means is composed of a metallic powder and an adhesive binder material.

6. An omnidirectional dielectric lens reflector as claimed in claim 1, wherein said means is a Nesa coating.

7. An omnidirectional dielectric lens reflector as claimed in claim 5 wherein said metallic powder is composed of aluminum.

8. An omnidirectional dielectric lens reflector as claimed in claim 5 wherein said adhesive binder material is polyvinyl acetate.

9. An omnidirectional dielectric lens reflector as claimed in claim 5 wherein said adhesive binder material is epoxy resin.

10. An omnidirectional dielectric lens reflector as claimed in claim 5 wherein said adhesive binder material is polyurethane resin.

References Cited

UNITED STATES PATENTS

| | | | |
|---|---|---|---|
| 2,716,190 | 8/1955 | Baker | 343—911 |
| 2,849,713 | 8/1958 | Robinson | 343—910 |
| 2,943,358 | 7/1960 | Hutchins et al. | 343—911X |
| 3,366,965 | 1/1968 | Ochiai | 343—911 |
| 3,465,362 | 9/1969 | Ochiai | 343—911 |

ELI LIEBERMAN, Primary Examiner

T. VEZEAU, Assistant Examiner